(12) United States Patent
Park et al.

(10) Patent No.: US 6,621,447 B2
(45) Date of Patent: Sep. 16, 2003

(54) METHOD AND APPARATUS FOR CONTROLLING ALARMS IN AN AUTOMOBILE INFORMATION SYSTEM

(75) Inventors: Hee-Gyoung Park, Seoul (KR); Philip E. Thistlethwaite, Des Plaines, IL (US); Vincent C. Formanek, Hillside, IL (US); Hiroshi Kainuma, Arlington Heights, IL (US)

(73) Assignee: Cobra Electronics Corporation, Chicago, IL (US)

(*) Notice: Subject to any disclaimer, the term of this patent is extended or adjusted under 35 U.S.C. 154(b) by 0 days.

(21) Appl. No.: 10/040,907

(22) Filed: Jan. 7, 2002

(65) Prior Publication Data

US 2003/0128148 A1 Jul. 10, 2003

(51) Int. Cl.$^7$ ................................................ G01S 7/42
(52) U.S. Cl. ........................... 342/20; 342/70; 342/106
(58) Field of Search .............................. 342/20, 70–72, 342/106, 104

(56) References Cited

U.S. PATENT DOCUMENTS

| | | | |
|---|---|---|---|
| 4,093,939 A | * 6/1978 | Mitchell | 180/271 |
| 4,373,497 A | * 2/1983 | Hamren | 123/568.27 |
| 4,604,529 A | 8/1986 | Grimsley et al. | |
| 4,876,527 A | * 10/1989 | Oka et al. | 180/170 |
| 5,510,793 A | * 4/1996 | Gregg et al. | 342/104 |
| 5,659,290 A | * 8/1997 | Haeri | 340/439 |
| 5,977,884 A | * 11/1999 | Ross | 340/904 |
| 6,037,862 A | 3/2000 | Ying | |
| 6,179,080 B1 | 1/2001 | Kikuchi | |
| 6,194,994 B1 | 2/2001 | Curran et al. | |
| 6,204,798 B1 | * 3/2001 | Fleming, III | 342/195 |
| 6,271,747 B1 | * 8/2001 | Fendt et al. | 340/436 |
| 6,415,223 B1 | * 7/2002 | Lin et al. | 701/208 |

FOREIGN PATENT DOCUMENTS

JP    Hei 6-22610    4/1990

* cited by examiner

Primary Examiner—Thomas H. Tarcza
Assistant Examiner—Isam Alsomiri
(74) Attorney, Agent, or Firm—Wallenstein & Wagner, Ltd.

(57) ABSTRACT

A method and apparatus for detecting a radar signal is disclosed. The method includes counting pulses emanating from an engine of a motor vehicle. An operating mode is determined in response to a moving average of pulses counted. An alarm signal is transmitted in response to detection of a radar signal and the operating mode.

11 Claims, 2 Drawing Sheets

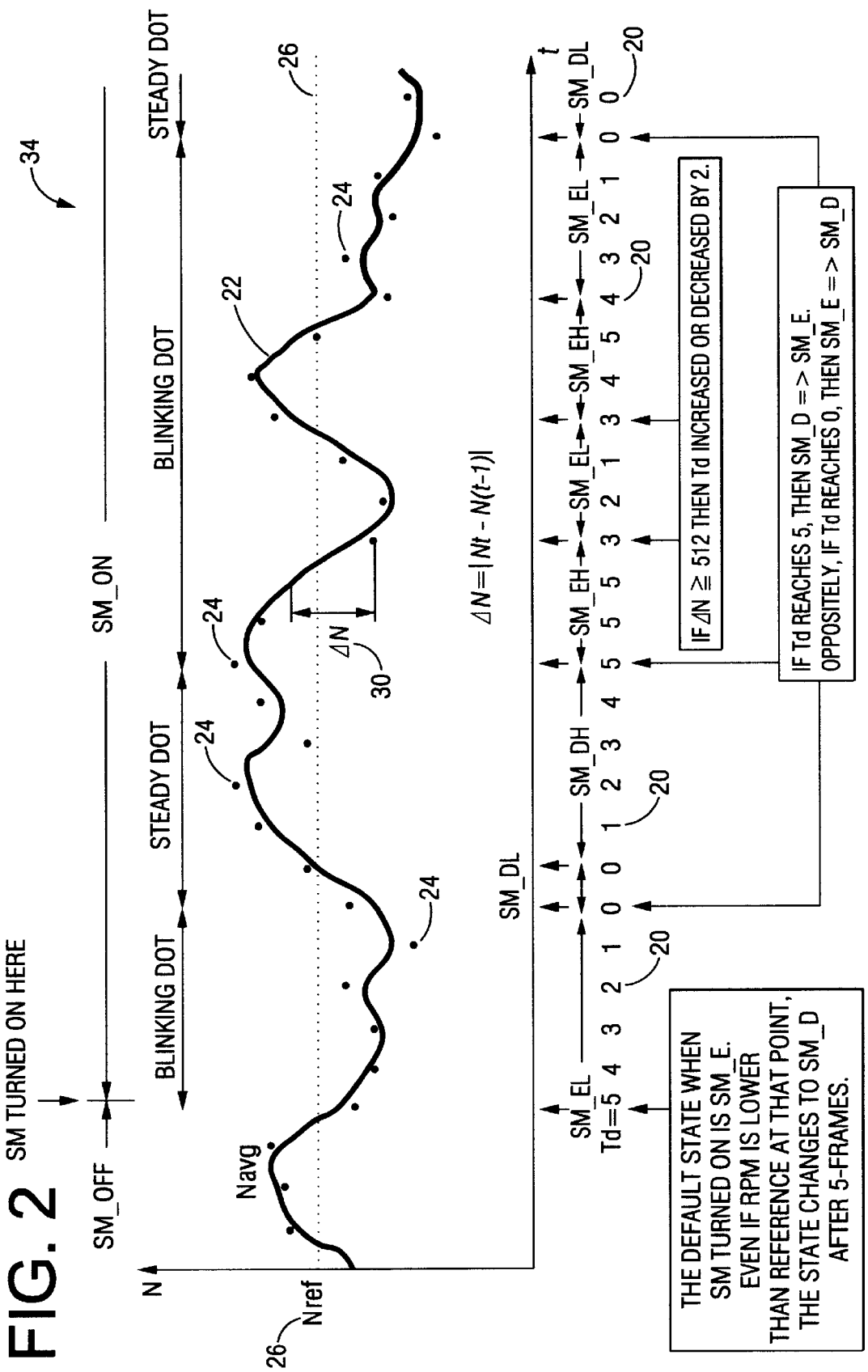

METHOD AND APPARATUS FOR CONTROLLING ALARMS IN AN AUTOMOBILE INFORMATION SYSTEM

DESCRIPTION

1. Technical Field

The present invention is generally related to radar detection devices. More specifically, the present invention is related to reducing the occurrence of unnecessary alarms by providing the ability to disregard detection of a radar signal during selected driving conditions.

2. Background of Invention

A radar detection device detects various signals having a bandwidth in the X, K, Ka, and laser frequencies. Frequently, radar signals within these bandwidths are transmitted to determine the velocity of a motor vehicle. A motorist utilizing the radar detection device is alerted when the presence of the radar signal is detected.

The received microwave signal may also have been transmitted to provide the motorist with information concerning an upcoming driving condition, i.e., road construction, traffic condition, emergency condition, etc. The radar detection device is capable of receiving these information signals and alerting the motorist accordingly. The informational signal may have been transmitted from Cobra's Safety Alert® traffic warning system, as well as other informational signaling systems.

Radar signals are also utilized in some security systems and operating systems, e.g., automatic door openers. It is possible for the radar detection device to detect these radar signals in addition to the radar signals utilized for determining vehicle speed. However, the motorist utilizing the radar detection device is not concerned with detecting radar signals unrelated to determining the speed of a motor vehicle. Such radar signals are considered extraneous by the motorist and have the same significance as a false alarm; even though a radar signal was detected. Repetitive notification of these extraneous radar signals erodes the motorist's confidence in the detection device. This lack of confidence adversely affects the motorist's attention and responsiveness to the alarm.

Similarly, alarm notification of a radar signal detection during certain driving conditions wherein the motorist is generally not concerned with detecting the radar signal, e.g., stopped or slow moving vehicle; further conditions the motorist to ignore the alarm. Radar signal detection during these particular driving conditions is unimportant to the motorist and is considered irrelevant, similar to the false signal detection. And again, habitually disregarding the alarm during some driving conditions can lull the motorist into ignoring the alarm signal during all driving conditions.

Repetitive notification of "false" or extraneous radar signals tends to promote the motorist's disinterest in the alarm. The motorist becomes indifferent and grows accustomed to regarding any alarm as a "false" alarm. Inevitably, the unwitting motorist fails to heed the warning of the radar detection device during a critical driving condition.

This invention is directed to solving these and other problems.

SUMMARY OF THE INVENTION

One embodiment of the present invention is directed to a method for alerting a motorist of a motor vehicle of a detection of a radar signal. The method comprises setting a reference threshold limit defining an operating mode. Pulses emanating from an electrical generator operably coupled to the motor vehicle are counted during a predetermined time period. The counted pulses are stored and a moving average of the pulses are calculated over a predetermined time duration. The predetermined time duration includes at least one predetermined time period. The operating mode is determined in response to the calculated moving average and the reference threshold limit.

A further aspect of the present invention includes utilizing more than one reference threshold limit.

Yet another embodiment of the present invention is directed to a radar detection device for use with a motor vehicle. The motor vehicle includes an electrical generator capable of supplying power to the radar detection device. The radar detection device comprises a power cord for connecting to a power port of the motor vehicle. A counter being operably connected to the power cord is utilized for counting pulses generated from the electrical generators. The pulses emanate from the electrical generator and are related to the revolutions of the engine which powers these generators. A reference threshold limit defines an operating mode including an enable mode and a disable mode. The operating mode is responsive to the pulses counted on the power cord. A detector detects a radar signal wherein an alarm signal is generated in response to the operating mode and the detector. An alarm, e.g., aural or visual, is transmitted in response to the alarm signal.

Another further aspect of the present invention includes an accelerometer for determining the velocity of the motor vehicle. The pulse counter verifies the velocity determined through integration of the measured acceleration of the vehicle. The alarm is transmitted in response to detection of the radar signal and the velocity of the motor vehicle.

An object of the present invention is to eliminate notifying a motorist of radar signal detection during driving conditions wherein the motorist is unconcerned with the presence of a radar signal.

A further object of the present invention is to enhance a driver's recognition and awareness to the presence of a radar signal by providing a radar detection device having the ability to suppress alarm signals during selected driving conditions.

Other advantages and aspects of the present invention will become apparent upon reading the following description of the drawings and detailed description of the invention.

BRIEF DESCRIPTION OF DRAWINGS

FIG. 2 depicts a graphical example of one embodiment of the present invention during operation.

DETAILED DESCRIPTION OF PREFERRED EMBODIMENT

Figure 1:
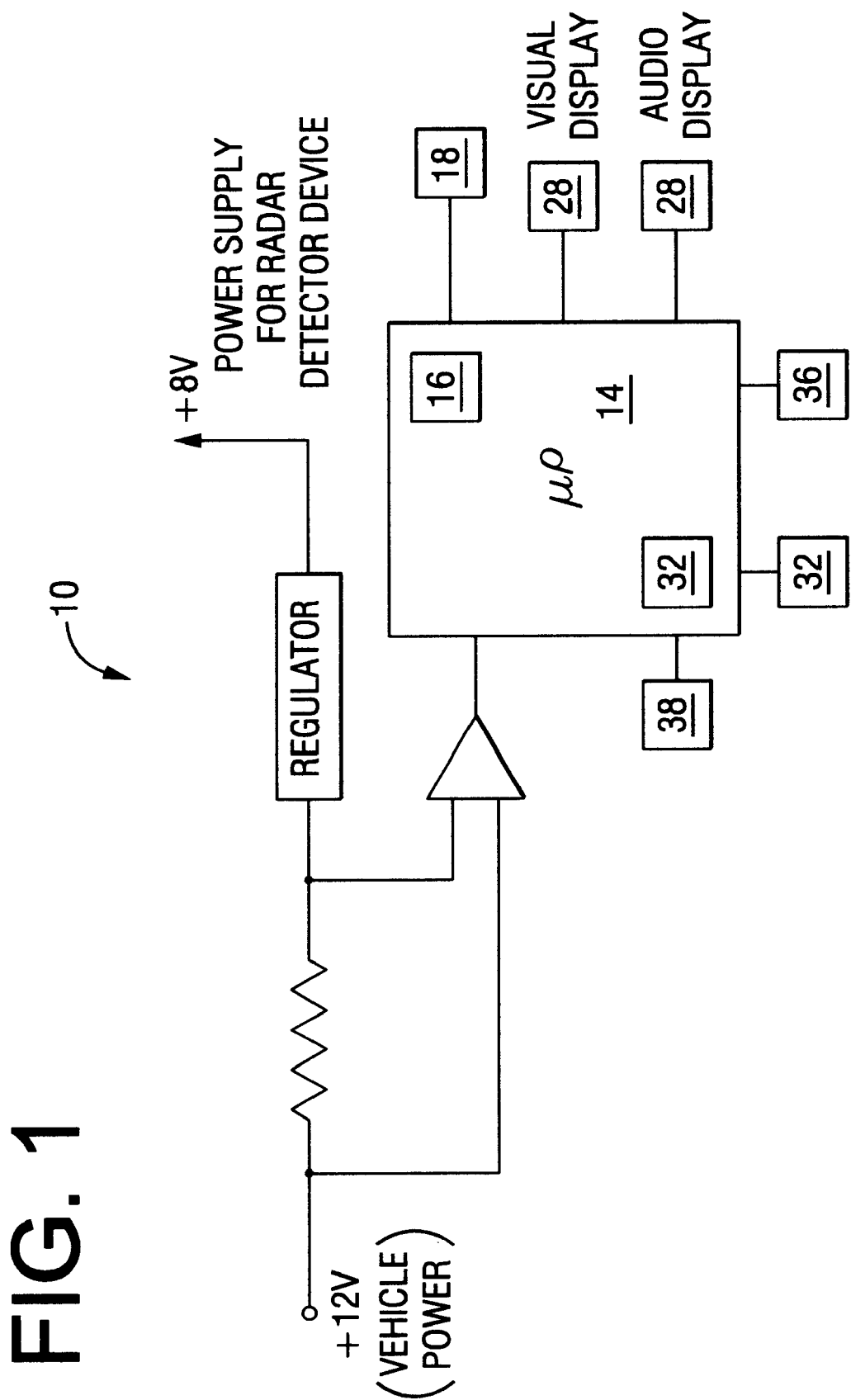
FIG. 1 is a block diagram of one embodiment of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Radar detection devices detect various radar signals having a bandwidth in the X, K, Ka, and laser frequencies. The detection device is capable of notifying a motorist of the detection of one of these signals being transmitted at the driver's vehicle. Other radar signals emanate from security systems and operating systems. Radar signals from such systems are considered unimportant to the motorist. Similarly, radar signals detected during selected driving conditions are also considered irrelevant by the motorist. These driving conditions generally include non-moving or slow moving motor vehicles. To fully benefit from the radar detection device, the motorist must be confident in the detector's ability to differentiate and notify the detection of relevant, non-extraneous, radar signals. Providing a radar detector with the ability to emit alarm signals only during selected driving conditions can enhance a motorist's recognition and responsiveness to the alarm.

The present invention is directed to enhancing the operability of a radar detection device 10. Real and false alarm signals generated by the detection device are often disregarded by a user because the alarm occurred during a specific driving condition wherein the user is not concerned with alarm notification of radar signal detection. These driving conditions primarily involve the motor vehicle traveling at low speeds. However, the motorist is able to select one or more driving conditions.

Referring to the Figures, specifically FIG. 1, a block diagram depicts one embodiment of the present invention, i.e., a radar detection device 10 for use with a motor vehicle. The motor vehicle includes an electrical generator capable of supplying power to the radar detection device 10, as well as other devices. The radar detection device 10 comprises a power cord 12 for connecting to a power port of the motor vehicle. A processor 14 having a counter 16 is operably connected to the power cord 12. The counter 16 is capable of counting pulses emanating from the electrical generator. These pulses arising from the electrical generator are related to the motor vehicles's engine and traveling speed. A first reference limit 26 defines an operating mode having an enable mode and a disable mode. The operating mode is responsive to pulses 24 counted on the power cord 12. A detector 18 is utilized to detect the presence of a radar signal. An alarm signal is generated in response to the operating mode and the detector 18. An alarm 28 is responsive to the alarm signal. The alarm 28 can be displayed aurally, visually, or both.

The radar detection device 10 is operably connected to a power source of a motor vehicle, preferable a +12V power port, e.g., cigarette lighter. The vehicle's power source is operably connected to an electrical generator, which is connected to the engine of the motor vehicle. The power supplied to the power source includes electrical noise. One source of this noise is the firing of the motor vehicle's spark plugs, which is proportional to the revolutions per minute of the engine. The firing of a spark plug will cause a pulse to appear on the power line 12. Although the pulse frequency is indicative of engine revolutions and the velocity of the vehicle, the motor vehicle's velocity is also dependent on the driving gear and engine size of the vehicle. Nevertheless, monitoring and counting these pulses facilitates determining relevant radar signals.

The motorist selects the reference threshold limit 26 that defines an enable operating mode and a disable operating mode of the detection device 10. Preferably, the motorist revs the motor vehicle engine and sets the limit 26 at the desired pulse frequency. Monitoring a pulse frequency 22 relative to the reference threshold limit 26 facilitates determining the detection device's 10 operating mode. The detection device 10 monitors the amount of pulses occurring on the power line 12. Preferably, the pulses are counted during a time frame 20 having a duration of one second. Several time frames 20 are stored and utilized to calculate a moving average 22 of pulses 24 occurring on the power line 12. Initially, five time frames 20 are used wherein the counted pulses 22 occurring during these time frames are averaged. If the moving average 22 of the pulses 24 occurring within the five time frames 20 exceeds the limit 26 set by the user, the vehicle is considered to be traveling at a speed relatively greater than the set limit. If the average pulse count 22 remains above the set reference 26, i.e., high, for 5 consecutive time frames 20, the radar detector 10 is operating in the enable mode. While in the enable operating mode, any detection of a radar signal will generate an alarm 28, e.g., aural and visual, from the device 10. Preferably, an indicator 38, e.g., LED, speaker; will steadily activate during the enable operating mode.

If the moving average 22 of pulses 24 counted on the power signal does not exceed the predetermined limit 26, the vehicle is considered to be traveling at a speed relatively less than the set threshold limit. If the moving average 22 pulse count remains below the set reference 26, i.e., low, for 5 consecutive time frames 20, the radar detector 10 is operating in the disable mode. While operating in the disable mode, any alarm signal generated in response to detection of a radar signal will be suppressed. Although both the aural and visual alarm can be suppressed, it is preferred that only the audio alarm will be silenced and the visual alarm will remain visible. The indicator 38 will periodically activate, e.g., blink, or chirp; while the detector 10 is in the disable operating mode.

The radar detection device 10 continues monitoring the pulses 24 occurring on the power signal and determining the average number of pulses 22 over the predetermined time period. If the moving average 22 transverses the set reference 26 for a predetermined time period, e.g., five seconds, the operating mode will be switched.

Another embodiment of the present invention contemplates utilizing the rate of change 30 in the pulse count 24 from one time frame 20 to the next in determining the determining the operating mode of the detection device 10. The pulse counts 24 are monitored and any significant change, increase or decrease, is utilized to calculate the state of the operating mode. The pulses 24 are sampled over a predetermined time interval, preferably at a rate of 100 mS over 1 S. The ten samples are stored in memory 32 and utilized to adjust the duration of the operating mode of the detection device 10.

Referring to FIG. 2, a graph 34 exemplifies one operational embodiment of the present invention. The graph 34 reflects a series of data points, i.e., dots, representing pulses 22, N, counted on the power line 12 over time, t. Initially, the radar detection device 10 is brought up in the enable operating mode, (smart-mute, SM_E), independent of the velocity of the vehicle being above or below the selected reference 26, Nref. When the radar detection device 10 is turned on, the operating mode is enabled wherein detection of a radar signal will result in an alarm signal being transmitted, preferably aural, visual, or both.

An initial default of five time frames 20 are utilized to calculate the moving average 22 of counted pulses 24. The moving average 22 is depicted by the solid line in the graph 34. If the moving average 22 exceeds the selected reference 26 for five consecutive time frames 20, the operating mode is enabled and detection of a radar signal results in an alarm signal. If the moving average 22 remains below the selected reference 26 for five consecutive time frames 20, the operating mode is disabled, SM_D, wherein detection of a radar signal does not result in an audible alarm.

Initially, the graph 34 shows the running average 22 being below the selected reference limit 26 just prior to the radar detector 10 being turned on. At this point, the radar detector 10 enables detection of a radar signal to generate an alarm signal. During the next five consecutive time frames 20, the running average 22 has remained below the reference amount 26; thus, the operating mode becomes disabled. Any detection of a radar signal will result in the alarm being muted. This is because the motorist desires not to be notified of any radar detections occurring when the average pulse count 22 is less than the selected limit 26. The time duration utilized for consecutive time frames 20 during determination of the operating mode can be selected by the user. Next, the relative speed of the motor vehicle compared to the set limit 26 begins to increase and exceed the selected threshold as reflected by the increased amount of pulses 24 counted and the ramping up of the running average 22. After five consecutive time frames 20 of a running average 22 being above the selected threshold 26, the operating mode of the radar detector 10 will again be enabled and detection of any radar signal will result in an alarm, preferably aurally and visually.

Although the occurrence of five consecutive time frames 20 above or below the selected reference 26 is required to maintain the operating mode, the rate of change 30 of the counted pulses 24 is monitored and can affect the time duration utilized during determination of the operating mode. A significant rate of change 30, $\Delta N$, between adjacent time frames 20 can decrease the length of time required to change operating modes. Specifically, a considerable acceleration or deceleration of the motor vehicle can decrease the length of time required to enable or disable the operating mode of the radar detection device 10. If the pulse count 24 increases or decreases beyond a predetermined rate 30, the length of the time duration, Td, is increased, or decreased, accordingly, i.e., a count of a time frame 20 is added or removed from a running total. Essentially, the duration of the time period required for changing the operating modes of the radar detector 10 is shortened. Utilizing the rate of change 30 between two adjacent pulse counts 24 will provide for a more responsive radar detection device 10 as the motor vehicle may soon be exceeding the predetermined limit 26. In response to the high rate of change 30, the detection device 10 will respond by allowing the operating mode to be enabled or disabled more quickly, if necessary.

For example, if the rate of change 30, $\Delta N$, is $\geq 512$ pulses between consecutive time frames 20, Td is increased, or decreased, by 2 time frames instead of the usual 1 time frame. It is also understood by the present invention that the rate of change 30 can be higher or lower than 512 pulses and that fractions or multiples of time frames 20 can be added or removed to the time duration in response to the rate change. Thus, when Td reaches 5, the radar detector is enabled; and when Td reaches 0, the radar detector operating mode is disabled.

It is preferable to suspend pulse counting during transmission of the audio alarm. Transmission of the audio alarm can affect the counting of the pulses and adversely affect the determination of the radar detection device's operating mode. An "auto-mute" feature of the radar detection device can be incorporated in this situation. "Auto mute" reduces the decibels of the alarm after a predetermined time has elapsed, preferably to an audio level of approximately 14 dBs lower. This lower volume level will not adversely affect the pulse counting and counting can be resumed if "auto-mute" is utilized.

The present invention further contemplates the use of an accelerometer 36 to determine the velocity of the motor vehicle. The velocity of the motor vehicle is determined by the measuring and integrating the vehicle's acceleration. The accuracy of integrated acceleration is certified by verifying it against a derived velocity calculated via the processor/pulse counter method described above. The user can select the level of accuracy required during comparison of the integrated velocity and the pulse derived velocity. The integrated velocity can be adjusted accordingly for later use with the detector 10.

While the specific embodiment has been illustrated and described, numerous modifications come to mind without significantly departing from the spirit of the invention, and the scope of protection is only limited by the scope of the accompanying claims.

We claim:

1. A method for alerting a motorist driving a motor vehicle of a detection of a radar signal, the method comprising the steps of:

setting a reference threshold limit, the reference threshold limit defining an operating mode;

counting pulses derived from an electrical generator operably coupled to the motor vehicle;

storing a pulse count, the pulse count representing the pulses counted during a predetermined time period;

calculating a moving average of the pulse count over a predetermined time duration, the predetermined time duration comprising at least one predetermined time period;

determining the operating mode in response to the calculated moving average of the pulse count over the predetermined time duration and the reference threshold limit; and, transmitting an alarm signal in response to the detection of the radar signal and the operating mode.

2. The method of claim 1 wherein calculating the moving average of pulse count comprises the steps of:

summing the amount of pulses counted during the predetermined time duration and dividing the sum by an amount of predetermined time periods constituting the predetermined time duration; and, monitoring the average with respect to the pulse reference limit wherein an existence above or below the limit for a predetermined time establishes the operating mode.

3. The method of claim 2 further comprising the steps of:

determining the rate of change of pulses occurring during the predetermined time period; and, utilizing the rate of change of pulses occurring during the predetermined time period wherein the time duration is responsive to the rate of change of pulses occurring.

4. The method of claim 3 wherein determining the rate of change of pulses occurring during the predetermined time period comprises the steps of:

sampling the pulse count during the predetermined time period, the sampling rate being approximately 100 mS.

5. The method of claim 3 further comprising the step of:

adjusting the time duration in response to the rate of change exceeding a predetermined change rate.

6. The method of claim 5 wherein adjusting the time duration comprises the step of:

reducing the time duration by one or more time periods.

7. The method of claim 1 further comprising: adjusting the reference threshold limit; and, storing the adjusted reference threshold limit.

8. The method of claim 1 further comprising: indicating the operating mode.

9. The method of claim 1 further comprising: transmitting an audio alarm in response to the alarm signal; suspending the counting of the pulses; reducing audio alarm; and, continuing the counting of the pulses.

10. A method for alerting a motorist driving a motor vehicle of a detection of a radar signal, the method comprising the steps of:

- setting a velocity reference threshold limit, the velocity reference threshold limit defining an enable operating mode and a disable operating mode;
- measuring an acceleration of the motor vehicle;
- integrating the acceleration to determine a velocity of a motor vehicle;
- transmitting an alarm signal in response to detection of the radar signal and an operating mode responsive to the determined velocity; and,
- certifying the accuracy of the determined velocity, wherein certifying the accuracy of the determined velocity comprises the steps of:
  - counting pulses being related to the speed of an electrical generator operably coupled to the motor vehicle;
  - storing the pulse count occurring during a predetermined time period;
  - converting the pulse count to a value indicative to the motor vehicle's velocity; and,
  - verifying the determined velocity with the converted velocity.

11. A radar detection device for use with a motor vehicle, the motor vehicle having an electrical generator capable of supplying power to the radar detection device, the radar detection device comprising:

- a power cord for connecting to the power supply of the motor vehicle;
- a counter being operably connected to the power cord, the counter for counting pulses generated from the electrical generator, the pulses being generated from the electrical generator and being proportional to the motor vehicle's engine speed;
- a first reference limit defining a first operating mode, the first operating mode comprising a first enable mode and a first disable mode, the first operating mode being responsive to the pulses counted on the power cord;
- a detector for detecting a radar signal;
- an alarm signal being generated in response to the first operating mode and the detector;
- an alarn being responsive to the alarm signal; and,
- a calculator being capable of determining a running average of pulses counted over a predetermined time duration, the time duration comprising a plurality of time frames wherein each time frame includes a pulse count, the first operating mode being operably responsive to the running average of pulses.

* * * * *

UNITED STATES PATENT AND TRADEMARK OFFICE
CERTIFICATE OF CORRECTION

PATENT NO. : 6,621,447 B2
DATED : September 16, 2003
INVENTOR(S) : Park et al.

It is certified that error appears in the above-identified patent and that said Letters Patent is hereby corrected as shown below:

Column 4,
Lines 39-40, delete "the determining"

Column 8,
Line 22, delete "alarn" and insert -- alarm -- therefor.

Signed and Sealed this

Fourteenth Day of September, 2004

JON W. DUDAS
*Director of the United States Patent and Trademark Office*